(12) United States Patent
Joung et al.

(10) Patent No.: US 7,933,313 B2
(45) Date of Patent: Apr. 26, 2011

(54) SIGNAL QUALITY MEASURING APPARATUS FOR WIBRO SYSTEM AND THE METHOD THEREOF

(75) Inventors: Jinsoup Joung, Seongnam (KR); Jaesung Lee, Seongnam (KR); Seunghwan Ji, Seongnam (KR)

(73) Assignee: Innowireless Co., Ltd., Seongnam (KR)

( * ) Notice: Subject to any disclaimer, the term of this patent is extended or adjusted under 35 U.S.C. 154(b) by 1022 days.

(21) Appl. No.: 11/745,757

(22) Filed: May 8, 2007

(65) Prior Publication Data
US 2007/0258356 A1    Nov. 8, 2007

(30) Foreign Application Priority Data

May 8, 2006  (KR) .................. 10-2006-0040975

(51) Int. Cl.
*H04B 1/00* (2006.01)
*H04B 7/216* (2006.01)
*H04L 27/06* (2006.01)
*H04L 12/413* (2006.01)
*H04W 4/00* (2009.01)

(52) U.S. Cl. ........ 375/147; 375/140; 375/142; 375/146; 375/340; 375/343; 370/328; 370/335; 370/441; 370/445

(58) Field of Classification Search .................. 375/140, 375/147, 340; 370/279, 338
See application file for complete search history.

(56) References Cited

U.S. PATENT DOCUMENTS

| | | | | |
|---|---|---|---|---|
| 7,616,679 B2 * | 11/2009 | Choi et al. | ..................... | 375/147 |
| 7,649,963 B2 * | 1/2010 | Choi et al. | ..................... | 375/340 |
| 2006/0078040 A1 * | 4/2006 | Sung et al. | ..................... | 375/140 |
| 2006/0251034 A1 * | 11/2006 | Park | .............................. | 370/338 |
| 2007/0268846 A1 * | 11/2007 | Proctor et al. | ................. | 370/279 |
| 2008/0031392 A1 * | 2/2008 | Joung et al. | ..................... | 375/354 |
| 2008/0069080 A1 * | 3/2008 | Joung et al. | ..................... | 370/350 |
| 2008/0108316 A1 * | 5/2008 | Joung et al. | ................. | 455/226.1 |

OTHER PUBLICATIONS

Hyoungsoo Lim; Dong Seung Kwon. "Initial Synchronization for WiBro" Communications, 2005 Asia-Pacific Conference on. 2005, pp. 284-288.*

Hyoungsoo Lim; Dong Seung Kwon. "Initial Synchronization for WiBro". Communications, 2005 Asia-Pacific Conference on. 2005, pp. 284-288.*

* cited by examiner

*Primary Examiner* — Chieh M Fan
*Assistant Examiner* — Eboni Giles
(74) *Attorney, Agent, or Firm* — Rothwell, Figg, Ernst & Manbeck, P.C.

(57) ABSTRACT

Disclosed herein are a signal quality measuring apparatus for the WiBro system and a method thereof. The signal quality measuring apparatus for a WiBro system includes a WiBro signal reception unit, a preamble code correlation unit, a channel compensation/demodulation unit, and a control unit. The WiBro signal reception unit receives a WiBro signal from each base station. The preamble code correlation unit searches the WiBro signal for a number of preamble codes equal to the number of base stations for which measurement of signal quality measurement is required. The channel compensation/demodulation unit acquires the information of a Frame Control Header (FCH) section and a DownLink-MAP (DL-MAP) section with reference to the preamble codes found by the preamble code correlation unit, and demodulates the information of a unique number of the base station. The control unit collects and processes the information about the unique number of the base station demodulated by the channel compensation/demodulation unit, and information about signal quality of the preamble codes found by the preamble code correlation unit.

2 Claims, 4 Drawing Sheets

[Fig. 1]
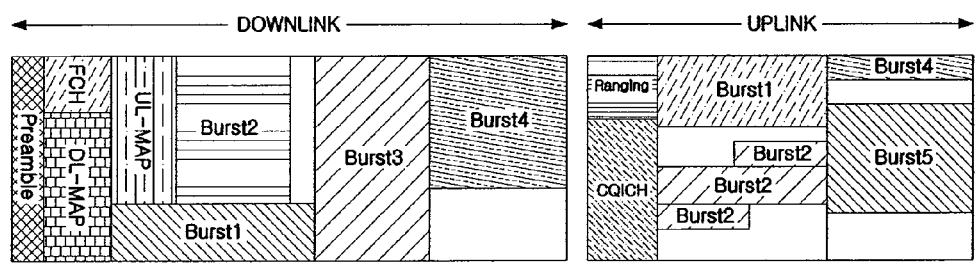
[Fig. 2]
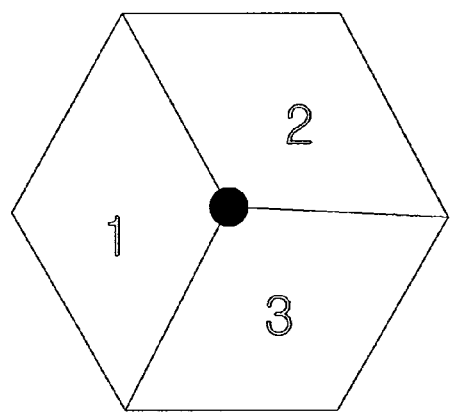

[Fig. 3]
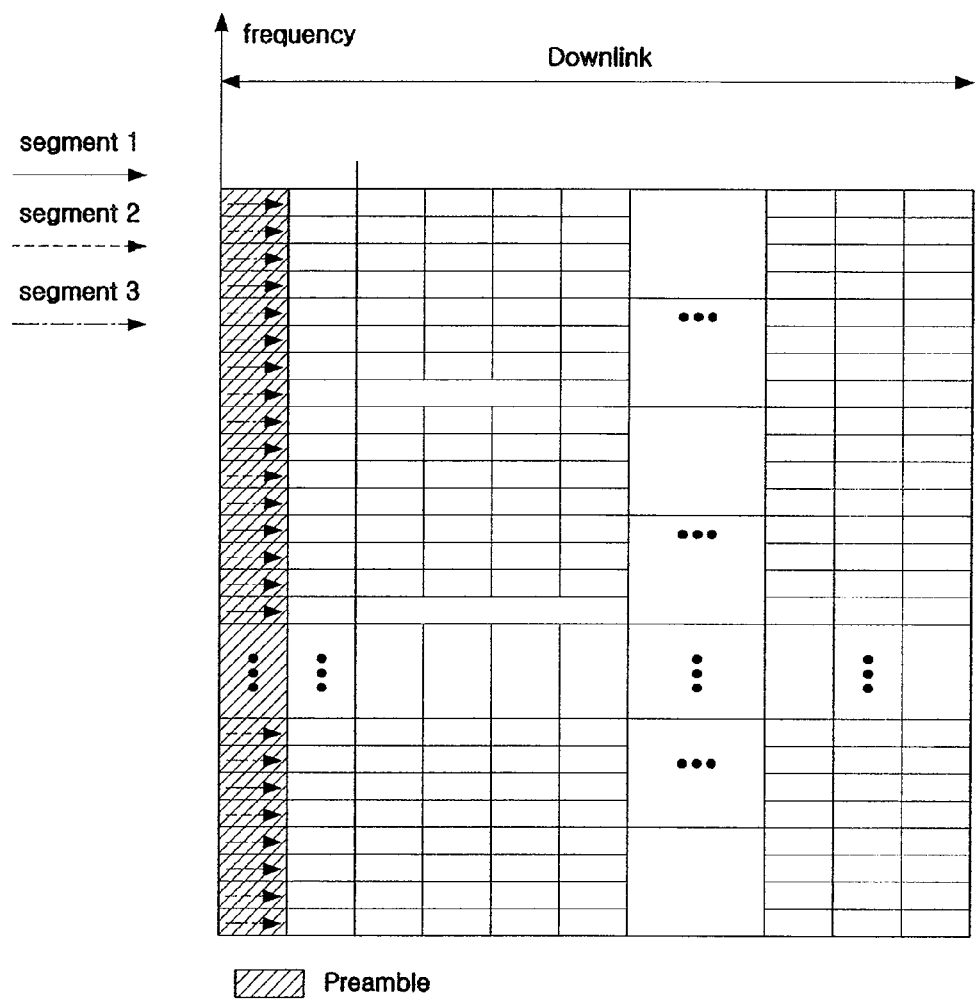

[Fig. 4]
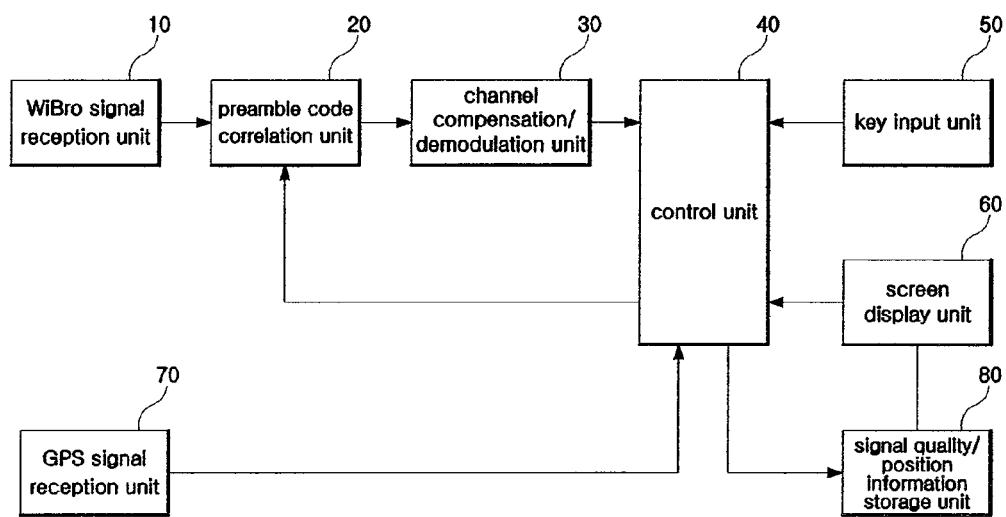

[Fig. 5]
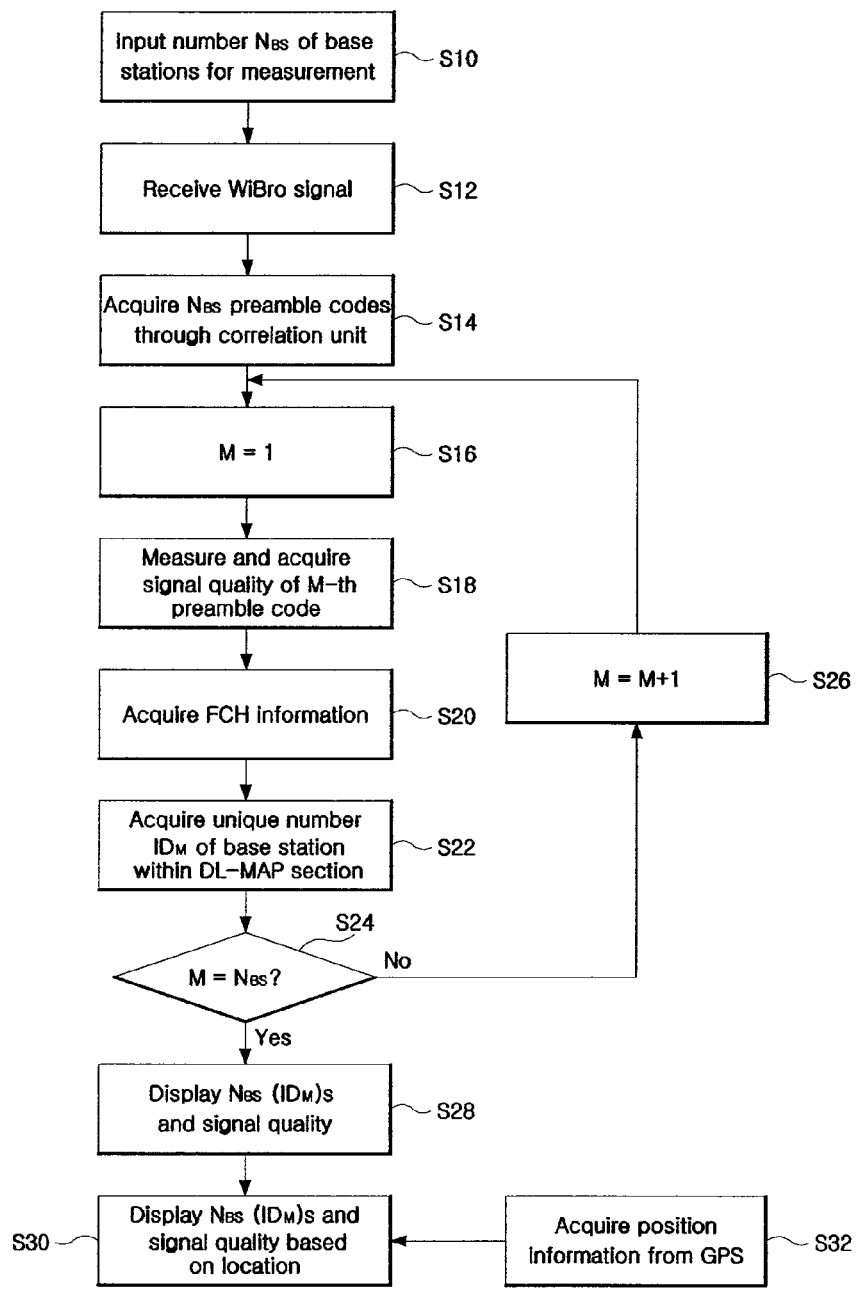

SIGNAL QUALITY MEASURING APPARATUS FOR WIBRO SYSTEM AND THE METHOD THEREOF

CROSS REFERENCE TO RELATED APPLICATION

This application claims priority under 35 U.S.C. §119 based on Korean Patent Application No. 10-2006-0040975 filed May 8, 2006, which is incorporated herein in its entirety.

BACKGROUND OF THE INVENTION

1. Field of the Invention

The present invention relates, in general, to a signal quality measuring apparatus for a WiBro (Wireless Broadband) system and a method thereof and, more particularly, to a signal quality measuring apparatus for a WiBro system and a method thereof, which are capable of measuring the quality of a WiBro signal received from each base station of the WiBro system.

2. Description of the Related Art

In a base station-based data communication system of current wireless communication systems, such as a cellular system, the necessity for a signal quality measuring apparatus, used in the maintenance and repair of the base station, is urgent because it is directly related to service quality. However, in the case of a Code Division Multiple Access (CDMA) system, which belongs to several cellular systems and has already been successfully commercialized, a measuring apparatus capable of measuring the signal quality of neighboring base stations in a wireless environment has already been marketed. Furthermore, for a Wideband Code Division Multiple Access (WCDMA) system and a CDMA 2000 system, signal quality measuring apparatuses have already been developed in accordance with the CDMA standards.

In contrast, in the case of an Orthogonal Frequency Division Multiplexing (OFDM) system, which is a wireless communication technique that has become as widely known as the CDMA system, the implementation of the OFDM system in a cellular system has been somewhat delayed compared to the CDMA system. Recently, the Korean WiBro system has been taking the first steps toward the commercialization of the WiBro system.

Therefore, to efficiently plan the cells of the WiBro system, it is necessary to develop a signal quality measuring apparatus capable of measuring the quality of a WiBro signal received from each base station of the WiBro system. However, such a signal quality measuring apparatus has not been developed to date.

SUMMARY OF THE INVENTION

Accordingly, the present invention has been made keeping in mind the above problems occurring in the prior art, and an object of the present invention is to provide a signal quality measuring apparatus for a WiBro system and a method thereof, which are capable of measuring the quality of a WiBro signal received from each base station of the WiBro system, thereby enabling the efficient cell planning of the WiBro system.

In order to accomplish the above object, the present invention provides a signal quality measuring apparatus for a WiBro system, comprising a WiBro signal reception unit for receiving a WiBro signal from each base station; a preamble code correlation unit for searching the WiBro signal for a number of preamble codes equal to the number of base stations for which measurement of signal quality measurement is required; a channel compensation/demodulation unit for acquiring the information of a Frame Control Header (FCH) section and a DownLink-MAP (DL-MAP) section with reference to the preamble codes found by the preamble code correlation unit, and demodulating information of a unique number of the base station; and a control unit for collecting and processing the information about the unique number of the base station demodulated by the channel compensation/demodulation unit, and information about signal quality of the preamble codes found by the preamble code correlation unit.

In addition, the present invention provides a A signal quality measurement method for a WiBro system, comprising the steps of (a) receiving a WiBro signal from each base station and acquiring a number of preamble codes equal to a number of respective base stations; (b) searching for a descending order of correlation value between the acquired preamble codes across all segments; (c) acquiring FCH information based on the segments of the acquired preamble codes; (d) acquiring information about a unique number of the base station included in data within a DL-MAP by accessing unique number information of the corresponding base station using the acquired FCH information; and (e) arranging and outputting information about acquired unique numbers of respective base stations and signal quality thereof in descending order of correlation value.

BRIEF DESCRIPTION OF THE DRAWINGS

The above and other objects, features and advantages of the present invention will be more clearly understood from the following detailed description taken in conjunction with the accompanying drawings, in which:

FIG. 1 is a diagram illustrating the configuration of a transmission frame in an OFDM-based WiBro system;

FIG. 2 is a view illustrating the state in which each base station is divided into three sectors in the WiBro system;

FIG. 3 is a view illustrating the positions of data in a frequency region according to each segment in the WiBro system;

FIG. 4 is a functional block diagram of a signal quality measuring apparatus for a WiBro system according to the present invention; and FIG. 5 is a flowchart illustrating a signal quality measuring method for a WiBro system according to the present invention.

DESCRIPTION OF THE PREFERRED EMBODIMENTS

A signal quality measuring apparatus for a WiBro system and a method thereof according to a preferred embodiment of the present invention will be described in detail with reference to the accompanying drawings.

FIG. 1 is a diagram illustrating the configuration of a transmission frame in an OFDM-based WiBro system. As illustrated in FIG. 1, in the OFDM-based WiBro system, information of data is represented across a temporal region (a lateral axis) and a frequency region (a vertical axis). An uplink and a downlink are classified according to time as the left region and the right region, respectively, as illustrated in the drawing.

In the above configuration, the uplink section may be divided into a preamble section, a Frame Control Header (FCH) section, a DownLink-MAP (DL-MAP) section, an UpLink-MAP (UL-MAP) section, and a data transmission section. In this case, data transmitted during the preamble section includes a signal for synchronization and a signal for cell demarcation, and is information that must be first examined when a WiBro terminal receives data. According to standards, the number of types of codes transmitted during the preamble section is 114. The WiBro terminal selects one, which has the highest degree of correlation, from among the 114 preamble codes, and becomes able to access the FCH section using the information of the selected preamble code.

Data within the FCH section includes information for the decoding of the DL-MAP data, which include information about a modulation method by which the DL-MAP data has been modulated and information about a coding method by which the DL-MAP data has been coded. In contrast, data within the DL-MAP section indicates a data section and a modulation method assigned to each WiBro terminal in the UL-MAP section and the data transmission section, and also includes information about the unique number of a base station selected by the WiBro terminal.

FIG. 2 is a view illustrating the state in which each base station is divided into three sectors in the WiBro system. FIG. 3 is a view illustrating the positions of data in a frequency region according to each segment in the WiBro system. As described above, the 114 types of different preamble codes may be classified according to three types of segment values. The three types of segments indicate 1, 2 and 3 regions, respectively, when one base station (cell) is divided according to sector, as illustrated in FIG. 2. The reason for this is to minimize interference in the frequency region in such a way that the preamble codes of different segments are made to exist in sectors adjacent to a user's position because the positions of data in the frequency region are determined according to each segment, as illustrated in FIG. 3.

FIG. 4 is a functional block diagram of a signal quality measuring apparatus for a WiBro system according to the present invention. The signal quality measuring apparatus for a WiBro system according to the present invention, as illustrated in FIG. 4, may include a WiBro signal reception unit 10 for receiving a WiBro signal from each base station, a key input unit 50 for receiving information about various selections and/or settings necessary for measurement, including the input of the number $N_{BS}$ of base stations for which the measurement of signal quality is required, a preamble code correlation unit 20 for searching the received WiBro signal for a number of preamble codes equal to the number $N_{BS}$ of base stations for which the measurement of signal quality is required, a channel compensation/demodulation unit 30 for acquiring the information of the FCH section and the DL-MAP section with reference to the preamble codes found by the preamble code correlation unit 20, and decoding information about the unique number $ID_M$ of each base station, a screen display unit 60 for displaying the various operating status of the measuring apparatus and/or the results of signal quality measurement, a Global Positioning System (GPS) signal reception unit 70 for receiving information about the current position of the measuring apparatus from GPS satellites, a signal quality/position information storage unit 80 for storing signal quality measured with the measuring apparatus and information about the measurement position thereof, and a control unit 40 for receiving information about the number $N_{BS}$ of base stations for which the measurement of signal quality is required from the key input unit 50, transferring it to the preamble code correlation unit 20, collecting information about the unique number $ID_M$ of each base station and signal quality for a preamble code, storing the collected information and signal quality in the signal quality/position information storage unit 80 along with information about the current position of the measuring apparatus received from the GPS signal reception unit 70, and outputting them through the screen display unit 60.

The operation of the signal quality measuring apparatus for the WiBro system according to the present invention is described in detail below, along with the method thereof.

FIG. 5 is a flowchart illustrating a signal quality measuring method for a WiBro system according to the present invention. It should be noted that the control unit 40 performs all operations, unless described otherwise. In the signal quality measuring method for the WiBro system according to the present invention, the quality of signals received from neighboring base stations can be measured through the following three processes. The first process is based on the measurement of the sizes of signals of neighboring base stations through the degree of correlation between preamble codes.

For this purpose, at step S10 of FIG. 5, information about the number of base stations for which the measurement of signal quality is required is received from a user through the key input unit 50. Hereinafter, it is assumed that the number of base stations, input as described, is $N_{BS}$. At step S12, a WiBro signal output from a base station is received through the WiBro signal reception unit 10. At step S14, $N_{BS}$ preamble codes for the received WiBro signal is acquired through the preamble code correlation unit 20.

At steps S16 to S26, the $N_{BS}$ preamble codes, which have been acquired at step S14, are searched for a descending order of correlation value, across all of the segments. In more detail, at step S16, a count M indicating the number of base stations is set to 1. At step S18, the signal quality of an M-th preamble code is measured and acquired. At step S20, FCH information is acquired based on the segment of the received preamble code. At step S22, information about the unique number $ID_M$ of a base station, included in data within the DL-MAP section, is acquired (a third process) by accessing the data within the DL-MAP section in which information about the unique number $ID_M$ of a corresponding base station exists, using the acquired FCH information (a second process).

At step S24, whether the count M has reached the base station number $N_{BS}$ input at step S10 is determined. If the count M has not reached the base station number $N_{BS}$, the process proceeds to step S28 at which a current count value is increased by 1, and then the process returns to step S16. In contrast, if the count M has reached the base station number $N_{BS}$, the process proceeds to step S28 at which information about the unique numbers $ID_M$ of respective base stations and the signal quality thereof are arranged and displayed in descending order of correlation value.

Thereafter, the GPS signal reception unit 70 acquires information about the current position of the measuring apparatus at step S32. At step S30, the unique number $ID_M$ of a corresponding base station and the quality of the received signal thereof based on the acquired information about the current position of the measuring apparatus are displayed on the screen display unit 60, and are also stored in the signal quality/position information storage unit 80.

In summary, assuming that the number of input base stations is $N_{BS}$, one of the found preamble codes is represented by $C_M (1 \leq M \leq N_{BS})$, one of the remaining 113 preamble codes is represented by $C_{\overline{M}} (1 \leq \overline{M} \leq 113, \overline{M} \neq M)$, and the correlation values thereof are $R_{C_M}$ and $R_{C_{\overline{M}}}$, the signal quality $Q_{C_M}$ for the preamble code $C_M$ can be expressed in the following equation:

$$Q_{C_M} = \frac{R_{C_M}}{\sum_{M \neq M, \overline{M}=1}^{114} R_{\overline{C_M}}}$$

As described above, in accordance with the signal quality measuring apparatus for the WiBro system and the method thereof according to the present invention, the operator of the measuring apparatus can know signal quality, varying depending on location, from the measuring apparatus, can search for shadow areas using the signal quality, and can determine whether to repair and install a base station. As a result, the quality of the WiBro system can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A signal quality measuring apparatus for a WiBro system, comprising:
   a WiBro signal reception unit for receiving a WiBro signal from each base station;
   a preamble code correlation unit for searching the WiBro signal for a number of preamble codes equal to a number of base stations for which measurement of signal quality measurement is required;
   a channel compensation/demodulation unit for acquiring information of a Frame Control Header (FCH) section and a DownLink-MAP (DL-MAP) section with reference to the preamble codes found by the preamble code correlation unit, and demodulating information of a unique number of the base station;
   a control unit for collecting and processing the information about the unique number of the base station demodulated by the channel compensation/demodulation unit, and information about signal quality of the preamble codes found by the preamble code correlation unit;
   a key input unit for receiving various selections or settings necessary for measurement, including input of the information about the number of base stations for which measurement of signal quality is required;
   a screen display unit for displaying various operating status or results of signal quality measurement of the measuring apparatus;
   a Global Positioning System (GPS) signal reception unit for receiving information about a current position of the measuring apparatus from GPS satellites; and
   a signal quality/position information storage unit for storing signal quality measured with the measuring apparatus and information about a position of the measurement thereof;
   wherein the control unit receives information about the number of base stations for which the measurement of signal quality is required from the key input unit, transfers the information about the number of the base stations to the preamble code correlation unit, collects information about unique numbers of each base station, which has been demodulated by the channel compensation/demodulation unit, and the signal quality of the preamble code, which has been found by the preamble code correlation unit, stores the unique number information and the signal quality in the signal quality/position information storage unit, along with information about a current position of the measuring apparatus, which is received from the GPS signal reception unit, and outputs the information about the unique number and the signal quality through the screen display unit.

2. A signal quality measurement method for a WiBro system, comprising the steps of:
   (a) receiving a WiBro signal from each base station and acquiring a number of preamble codes equal to a number of respective base stations;
   (b) searching for a descending order of correlation value between the acquired preamble codes across all segments;
   (c) acquiring FCH information based on the segments of the acquired preamble codes;
   (d) acquiring information about a unique number of the base station included in data within a DL-MAP by accessing unique number information of the corresponding base station using the acquired FCH information;
   (e) arranging and outputting information about acquired unique numbers of respective base stations and signal quality thereof in descending order of correlation value;
   (f) receiving a GPS signal and acquiring information about a current position of a measuring apparatus; and
   (g) displaying and storing a unique number of a corresponding base station and quality of a received signal thereof based on the acquired information about the current position of the measuring apparatus.

* * * * *